US012591644B2

(12) United States Patent
Shetty et al.

(10) Patent No.: US 12,591,644 B2
(45) Date of Patent: Mar. 31, 2026

(54) SYSTEMS AND METHODS FOR RESETTING CREDENTIALS FOR A MANAGEMENT CONTROLLER OF AN INFORMATION HANDLING SYSTEM

(71) Applicant: Dell Products, L.P., Round Rock, TX (US)

(72) Inventors: Harshendra Shetty, Bangalore (IN); Shivendra Katiyar, Bangalore (IN); Nikhil S, Hyderabad (IN)

(73) Assignee: Dell Products, L.P., Round Rock, TX (US)

( * ) Notice: Subject to any disclaimer, the term of this patent is extended or adjusted under 35 U.S.C. 154(b) by 157 days.

(21) Appl. No.: 18/472,917

(22) Filed: Sep. 22, 2023

(65) Prior Publication Data

US 2025/0103689 A1      Mar. 27, 2025

(51) Int. Cl.
| | |
|---|---|
| *G06F 21/31* | (2013.01) |
| *H04L 9/32* | (2006.01) |
| *H04L 9/40* | (2022.01) |

(52) U.S. Cl.
CPC ............ *G06F 21/31* (2013.01); *H04L 9/3247* (2013.01); *H04L 63/0838* (2013.01); *H04L 63/0846* (2013.01); *G06F 2221/2131* (2013.01)

(58) Field of Classification Search
CPC .. G06F 21/31; G06F 21/36; G06F 2221/2131; H04L 9/3226; H04L 9/3228; H04L 9/3239; H04L 9/3247; H04L 63/0838; H04L 63/0846; H04L 2463/121
See application file for complete search history.

(56) References Cited

U.S. PATENT DOCUMENTS

| | | | |
|---|---|---|---|
| 11,423,180 B2 | 8/2022 | Young et al. | |
| 2008/0276098 A1* | 11/2008 | Florencio | H04L 63/0838 |
| | | | 713/183 |
| 2014/0164781 A1* | 6/2014 | Joshi | H04L 9/3271 |
| | | | 713/184 |

(Continued)

OTHER PUBLICATIONS

Michael Albert Perks, et al., "Systems and Methods for Configuration of Witness Sleds," U.S. Appl. No. 18/306,303, filed Apr. 25, 2023, 40 pages.

*Primary Examiner* — Eric W Shepperd
(74) *Attorney, Agent, or Firm* — Fogarty LLP

(57) ABSTRACT

Systems and methods provide a password reset for a management controller, which is not exposed to the Internet. Upon receiving a request to reset the password, the management controller generates computer-readable information such as a barcode, where the computer-readable information indicates attributes of an information handling system associated with the management controller as well as a timestamp. A user can transmit the computer-readable information to a vendor application service via for example a mobile device that reads the computer-readable information. The vendor application service verifies the request and generates a temporary password from the timestamp and the attributes. Independently of the vendor application service, the management controller also generates the temporary password from the timestamp in the attributes. The vendor application service may then cause the temporary password to be sent to verified contact information.

19 Claims, 5 Drawing Sheets

| Management controller generates QR code from device info, It also generates a temporary password for the user using secret algorithm from device attributes and license key | User Scans QR code, capture geographical location and sends it to Vendor Application Service after log in using Mobile Application | Vendor application service validates information sent by Mobile Application and generates the temporary password using same secret algorithm. It sends the password to the contact information retrieved from cloud monitoring service | Device administrator user receives the temporary password as an email or text message | Device administrator uses the temporary password to set new password |

(56)     References Cited

U.S. PATENT DOCUMENTS

| | | | |
|---|---|---|---|
| 2014/0351589 A1* | 11/2014 | Chenna | H04W 12/068 |
| | | | 713/168 |
| 2015/0086017 A1* | 3/2015 | Taylor | H04L 9/3242 |
| | | | 380/270 |
| 2016/0335421 A1* | 11/2016 | Savage | G06Q 20/3821 |
| 2017/0316226 A1* | 11/2017 | Rahardjo | G06F 21/34 |
| 2019/0036914 A1* | 1/2019 | Tzur-David | H04L 9/0861 |
| 2023/0319570 A1* | 10/2023 | Shaw | H04W 12/10 |
| | | | 455/410 |
| 2023/0328820 A1* | 10/2023 | Shaw | H04W 16/22 |
| 2023/0385816 A1* | 11/2023 | Chuang | G06Q 20/3829 |
| 2024/0250813 A1* | 7/2024 | Revuri | H04L 9/0891 |

* cited by examiner

401

{
"ServiceTag": "BR1H903",
"iDRACFirmwareVersion": "5.00.00.00",
"Username": "User1",
"Timestamp": "2023-05-03T18:20:00.000Z",
"Signature":
"7857F90668CF24395E417AB7A001B663FC73877FF
FCF0EE88D4DF3915D28E3CD"
}

SYSTEMS AND METHODS FOR RESETTING CREDENTIALS FOR A MANAGEMENT CONTROLLER OF AN INFORMATION HANDLING SYSTEM

FIELD

The present disclosure relates generally to Information Handling Systems (IHSs) and relates more particularly to resetting credentials, such as a password, for a management controller of an IHS.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be deployed in a wide variety of locations and utilized in a wide variety of computational tasks. In some instances, IHSs may be servers configured to support edge computing at the physical edge of a network. Edge server IHSs may support connections between networks and/or may be provide users with entry points to a network. Located at edge locations, edge server IHSs store at least some information in physical proximity to users, thus minimizing latency and providing efficient computational capabilities without relying on remote computing, such as provided in cloud networks.

It may be desirable to maintain a level of security around an IHS to prevent access by malicious users. It may also be desirable to maintain a higher level of security around devices providing administration and control of an IHS. However, this desire to maintain higher levels of security may make password recovery a difficult task.

SUMMARY

In various embodiments, the chassis includes: a plurality of Information Handling Systems (IHSs), each comprising one or more CPUs (Central Processing Units); a management controller implemented in a first IHS of the plurality of IHSs, wherein the management controller is configured to support remote monitoring and administration of the first IHS, further wherein the management controller is configured to: receive a request to reset a first password, wherein the password provides access to the management controller; generate and display machine-readable information based upon a plurality of attributes of the first IHS; generate a temporary password based upon the plurality of attributes of the first IHS; receive input comprising a text string in a user interface (UI); verify that the text string matches the temporary password; and provide access to further functions of the management controller in response to the text string matching the temporary password.

In various embodiments, a method includes: receiving a message over a network from a mobile management application, wherein the request comprises a password reset request, wherein the message includes a first attribute of an Information Handling System (IHS), a username associated with the password reset request, a timestamp associated with the password reset request, and a signature associated with the IHS; verifying the username and the IHS, including accessing records associated with the username and the IHS and confirming consistency between information in the message and the records associated with the username and the IHS; generating a temporary password for the username, wherein the temporary password is based upon the first attribute of the IHS, the username, and the timestamp; accessing contact information associated with the IHS; and transmitting the temporary password to the contact information.

In various embodiments, a computer-readable storage device having instructions stored thereon for resetting a first password of a management controller of an Information Handling System (IHS), wherein execution of the instructions by one or more processors of the management controller causes the one or more processors to: generate and display machine-readable information based upon a first attribute of the IHS and a timestamp associated with a request to reset the first password; generate a temporary password based upon the first attribute of the IHS; receive input comprising a text string in a user interface (UI); verify that the text string matches the temporary password; and provide access to further functions of the management controller in response to the text string matching the temporary password.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
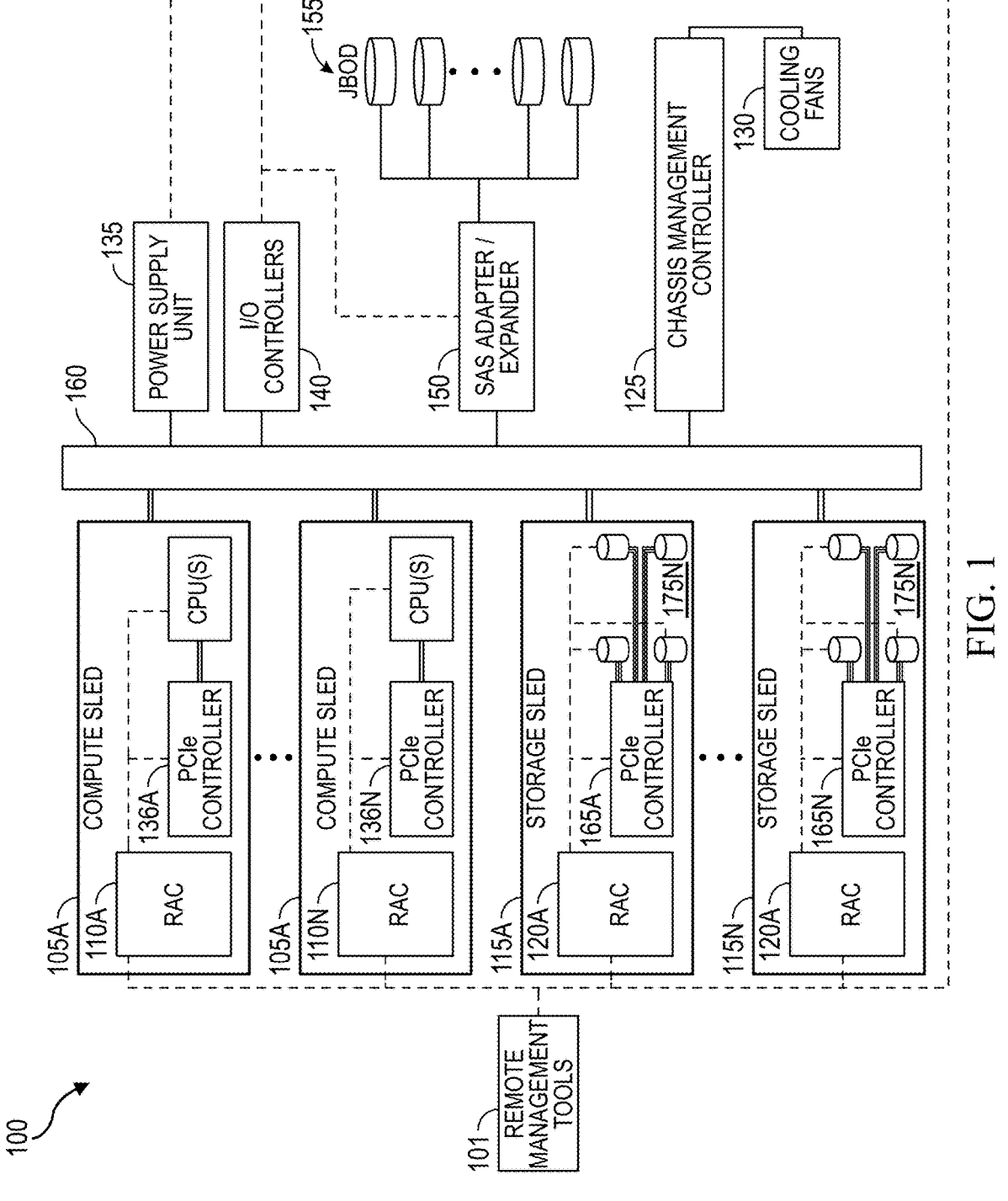
FIG. 1 is a diagram illustrating certain components of a chassis configured, according to some embodiments, to provide compute and/or data storage functions and to provide for password reset.

Data center administrators may be charged with administration responsibilities for a multitude of servers in a data center. Some servers include a remote access controller (also called a management controller) to provide out-of-band management. A data center administrator may access the remote access controller through an interface, which would typically be expected to require some level of authentication. For instance, a remote access controller interface may prompt an administrator for a username and password.

However, credentials may be lost or forgotten from time to time. Irregular password refresh cycles, infrequent password use, transfer of ownership, and the like are incidents that may lead to password loss. An administrator may regain or reset a password through various techniques. One example technique includes using a physical connection, such as through universal serial bus (USB) and using keyboard and mouse, where the technique assumes that physical access is secure. Nevertheless, there may be some scenarios in which physical access may pose a security risk, and such example technique may be undesirable or less desirable.

In another example technique, a data center administrator may reset the remote access controller entirely, thereby wiping out not only passwords but other existing settings of the remote access controller. While effective, such example technique may be seen as more trouble than it is worth. Also, such example technique assumes that physical access is secure, and as noted above, in some scenarios physical access may not be secure.

In yet another example technique, the data center administrator may rely on support services from a vendor. Specifically, a vendor may keep records regarding customers, their purchased assets, warranty status, and the like. The data center administrator may use a voice or video call or other appropriate measure to interact with a support employee to reset or regain the lost password. While such technique may be effective, it has costs, such as tying up human employees.

Various embodiments seek to provide secure and cost-effective techniques for resetting a password of a data administrator. In an example embodiment, the remote access controller itself includes a secure hashing algorithm to generate a temporary password based on a timestamp and one or more attributes of the server. Similarly, a vendor application, which is under control of the vendor and is not directly accessible by the data center administrator, is configured to use the same secure hashing algorithm to generate the same temporary password upon receipt of the timestamp and the one or more server attributes. During a password reset operation, the vendor application may generate the temporary password and acquire contact information of a designated customer administrative contact. The vendor application may then cause the temporary password to be transmitted to the designated customer administrative contact by, e.g., text message.

Since the same temporary password is generated at both the remote access controller and the vendor application, the remote access controller may verify the authenticity of the temporary password upon entry by the data center administrator, who received the temporary password at least indirectly from the vendor application. Once the password has been verified, the remote access controller may provide access to further functions, such as providing general access to the remote access controller, providing an interface for selection of a new password to replace the temporary password, and the like. Such example embodiments are described in more detail below.

FIG. 1 is a block diagram illustrating certain components of a chassis 100 that includes remote access controllers 110, 120, which are a type of management controller. In the present example embodiments, remote access controllers 110, 120 are configured to provide password reset procedures that are secure and convenient.

As described in additional detail below, embodiments may implement redundant data storage capabilities using chassis 100 resources such as removeable compute sled IHSs 105a-n and storage sled IHSs 115a-n. Embodiments of chassis 100 may include a wide variety of hardware configurations in which one or more IHS 105a-n, 115a-n are installed in chassis 100. Such variations in hardware configurations may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware and other software used by individual hardware components of the IHSs 105a-n, 115a-n, or by other hardware components of chassis 100, may be modified in order to update the operations that are supported by these hardware components. In some instances, such updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

Chassis 100 may include one or more bays that each receive an individual sled (that may be additionally or alternatively referred to as a tray, blade, and/or node) IHSs, such as compute sleds 105a-n, storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power, networking and/or processing capabilities. For instance, sleds installable in chassis 100 may be dedicated to providing power management or network switch functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational workloads, such as computations used in machine learning and other artificial intelligence systems, may utilize computational and/or storage resources that are shared within an IHS, within an individual chassis 100 and/or within a set of IHSs that may be spread across multiple chassis of a data center.

For instance, pooled storage resources of chassis 100, such as pools of shared storage drives, may be used to implement a virtual storage area network (vSAN). In particular, pooled storage drives of chassis 100 may be logically organized into disk groups, where each disk group may be utilized through the vSAN as a single logical storage drive. However, the scope of implementations is not limited to any particular use of chassis 100, as chassis 100 may be configured to provide compute resources, storage resources, a combination of compute and storage, or any appropriate use.

Implementing computing systems that span multiple storage resources of chassis 100, such as a vSAN may utilize high-speed data links between these storage resources and processing components of the chassis, such as peripheral component interconnect express (PCIe) connections that may form one or more distinct PCIe switch fabrics that are implemented by PCIe controllers 136 *a-n*, 165*a-n* installed in the IHSs 105*a-n*, 115*a-n* of the chassis. These high-speed data links may be used to support applications, such as vSANs, that span multiple processing, networking and storage components of an IHS and/or chassis 100.

Chassis 100 may be installed within a rack structure (not shown) that provides at least a portion of the cooling utilized by the IHSs 105*a-n*, 115*a-n* installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached Small Computer System Interface (SCSI) expander 150, network controller 140, chassis management controller 125 and/or power supply unit 135.

Figure 2:
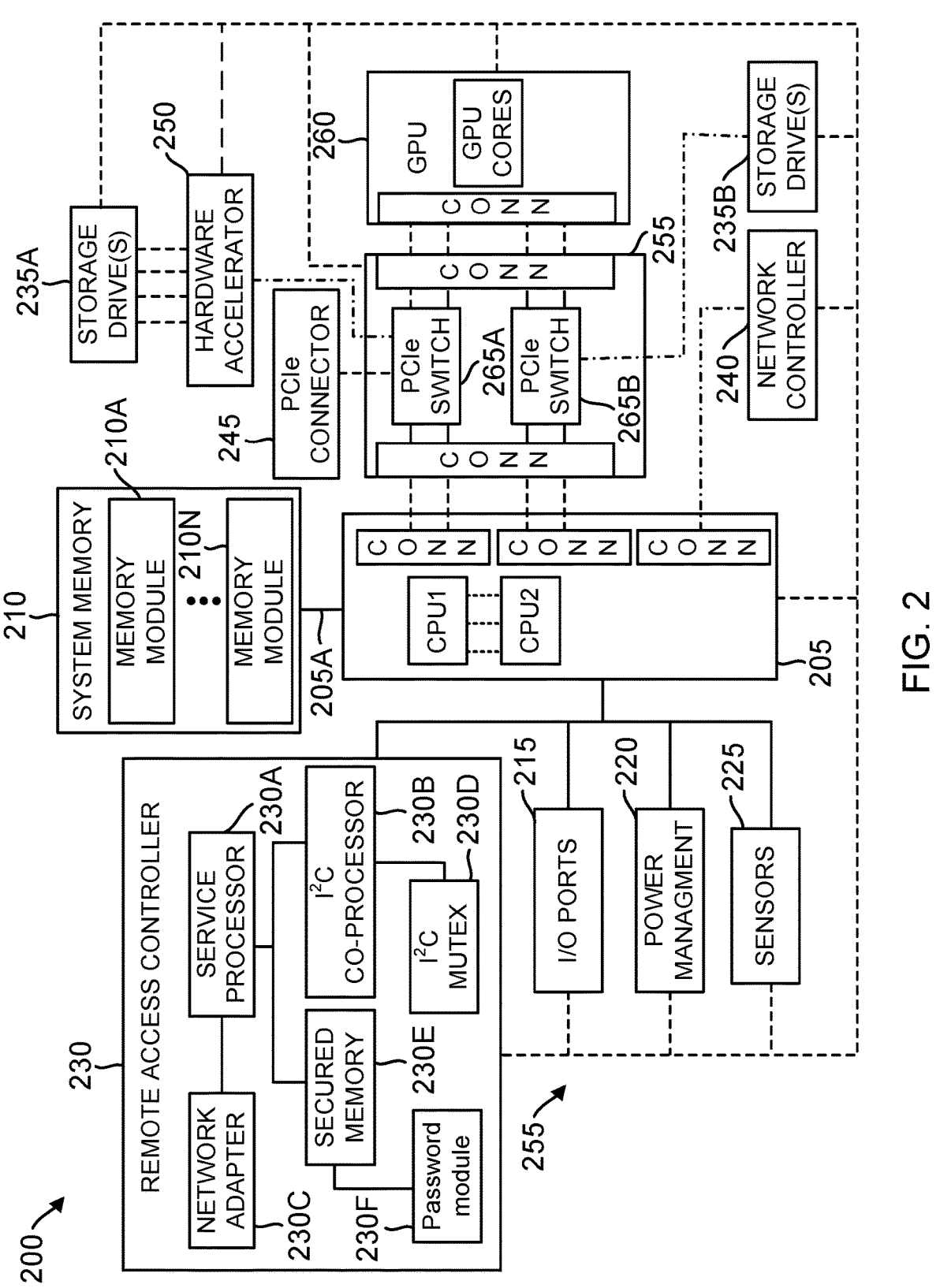
FIG. 2 is a diagram illustrating certain components of an IHS configured, according to some embodiments, for supporting password reset operations.

In certain embodiments, each individual compute/storage sled 105*a-n*, 115*a-n* may be an IHS such as described with regard to IHS 200 of FIG. 2. Sleds 105*a-n*, 115*a-n* may individually or collectively provide computational processing resources that may be used to support a variety of e-commerce, multimedia, business and scientific computing workloads, including machine learning and other artificial intelligence systems. Sleds 105*a-n*, 115*a-n* are regularly configured with hardware and software that provide leading-edge computational capabilities. Accordingly, services that are provided using such computing capabilities that are provided as high-availability systems that operate with minimum downtime, such as in the described edge computing environments.

As illustrated, each compute sled 105*a-n* and storage sled 115*a-n* includes a respective remote access controller (RAC) 110*a-n*, 120*a-n*. As described in additional detail with regard to FIG. 2, a remote access controller 110*a-n*, 120*a-n* provides capabilities for remote monitoring and management of a respective compute sled 105*a-n* or storage sled 115*a-n*. In support of these monitoring and management functions, remote access controllers 110*a-n* may utilize both in-band and side-band (i.e., out-of-band) communications with various managed components of a respective compute sled 105*a-n* or storage sled 115*a-n*. Remote access controllers 110*a-n*, 120*a-n* may collect various types of sensor data, such as collecting temperature sensor readings that are used in support of airflow cooling of the chassis 100 and the sleds 105*a-n*, 115*a-n*. In addition, each remote access controller 110*a-n*, 120*a-n* may implement various monitoring and administrative functions related to a respective sled 105*a-n*, 115*a-n*, where these functions may be implemented using sideband bus connections with various internal components of the chassis 100 and of the respective sleds 105*a-n*, 115*a-n*.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the software and hardware operating in the chassis 100. For example, remote management interface 101 may provide capabilities by which an administrator can initiate updates to the firmware utilized by hardware components installed in a chassis 100, such as for storage drives 175*a-n*. In some instances, remote management interface 101 may include an inventory of the hardware, software and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface. Furthermore, remote management interface 101 may provide password prompts, display barcodes or other information to be scanned by a mobile application, and the like during a password reset operation.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe controller 136 *a-n* that facilitates high speed access to computing resources described in additional detail with regard to FIG. 2, such as hardware accelerators, data processing units (DPUs), graphics processing units (GPUs), Smart network interface cards (NICs) and field programmable gate arrays (FPGAs). These computing resources may be programmed and adapted for specific computing workloads, such as to support machine learning or other artificial intelligence systems or to implement a vSAN.

As illustrated, chassis 100 includes one or more storage sleds 115*a-n* that are coupled to the backplane 160 and installed within one or more bays of chassis 100 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple storage drives 175*a-n*, where the individual storage drives 175*a-n* may be accessed through a PCIe controller 165*a-n* of the respective storage sled 115*a-n*. In some embodiments, these storage drives 175*a-n* may be pooled as part of a vSAN that provides redundant data storage, such that a failure, replacement or unavailability of any of the pooled storage drives does not render data lost or unavailable. In implementing vSANs, some or all of the storage drives 175*a-n* may be logically grouped into disk groups, where each group may be utilized as a single, logical storage drive. Some disk groups may be hybrid disk groups that include both solid-state drives (SDDs) and magnetic hard-disk drives (HDDs). In a vSAN configuration, multiple such disk groups available within a cluster of IHSs may be collectively utilized to provide a storage solution supporting large storage capacities, high availability and data redundancy.

In addition to the data storage capabilities provided by storage sleds 115*a-n*, chassis 100 may provide access to other vSAN storage resources that may be installed as components of chassis 100 and/or may be installed elsewhere within a datacenter that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed to support data redundancy using the various drives 155.

As illustrated, the chassis 100 of FIG. 1 includes a network switch 140, such as a PCIe switch, that provides network access to the sleds 105*a-n*, 115*a*-installed within the chassis. In some instances, network switch 140 may be an integrated component of a backplane 160 or other circuit board of chassis 100. In some instances, network switch 140 may be a replaceable component of chassis 100, such as replaceable sled that is received in a bay of the chassis 100. Network switch 140 may provide components of chassis 100 with access to external networks, either directly or indirectly via additional networking components. In some embodiments, network switch 140 may also support networking within the components of chassis 100, such as via a PCIe switch fabric that provides communications between each of the sleds 105*a-n*, 115*a-n* that are coupled to the chassis 100, and that may be used in the operation of a storage network using the resources of chassis 100.

Chassis 100 may also include a power supply unit 135 that provides the components of the chassis with various levels of DC power. In certain embodiments, power supply unit 135 may be implemented as a replaceable sled and multiple such sleds may be used to provide chassis 100 with redundant, hot-swappable power supply units. Chassis 100 may also include various input/output (I/O) controllers that may support various I/O ports, such as USB ports that may be used to support keyboard and mouse inputs and/or video display capabilities. Such I/O controllers may be utilized by a chassis management controller 125 to support various KVM (Keyboard, Video and Mouse) capabilities that provide administrators with the ability to operate the IHSs installed in chassis 100.

In addition to providing support for KVM capabilities for administering chassis 100, chassis management controller 125 may support various additional functions for sharing the infrastructure resources of chassis 100. In some scenarios, chassis management controller 125 may implement tools for managing the power 135, bandwidth available through network switch 140 and airflow cooling 130 that are available via the chassis 100. As described, the airflow cooling 130 utilized by chassis 100 may include an airflow cooling system that is provided by a rack in which the chassis 100 may be installed and managed by a cooling module of the chassis management controller 125.

As described in additional detail below, chassis management controller 125 may include a microcontroller or other logic unit that implements various management operations with respect to integrated and replaceable components of chassis 100, including operations for management of sleds 105*a-n*, 115*a-n*.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

As described, in implementing redundant data storage capabilities such as a vSAN, chassis 100 may include one or more replaceable compute or storage sleds 105, 115 that are received in bays of the chassis. Once inserted into these bays, an administrator may push some sleds 105, 115 within a bay until they are received by connectors that are located within the bays, such as connectors that are mounted on a backplane and that correspond to connectors that are located on the sled. Rather than being connected directly to fixed connectors of chassis 100, some sleds 105, 115 may be connected to chassis 100 through an administrator manually connecting these sleds to wires or cables provided by the chassis 100, in which case the administrator may manually remove the enclosure of chassis 100 in order to access these wires or cables.

In an example embodiment, chassis 100 is 2RU (Rack Units) in height and compute and storage sleds 105, 115 are horizontally installed sleds that are 1 RU in height. Also illustrated are two replaceable power supply units 135, each of which is a sled that is 1 RU in height, and each of which may be separately removed from the chassis 100. Embodiments may include a wide variety of sizes of chassis 100 and of the sizes and arrangements of sleds 105, 115 within the compartments of the chassis. An administrator may replace each of the sleds 105, 115 from time to time. In some instances, the operations of the remaining sleds may continue while a sled is being replaced, thus supporting high availability of computing functions supported by chassis 100. Accordingly, such chassis 100 may be ideally suited for use as edge servers deployed at edge locations used in support of critical computing systems.

FIG. 2 illustrates an example embodiment of an IHS 200 that may be used to implement data storage operations and compute operations and that is configured to support password reset operations such as described herein. It should be appreciated that although the embodiments described herein may describe an IHS that is a compute sled or similar computing component that may be deployed within the bays of a chassis, a variety of other types of IHSs may also operate according to embodiments described herein. In the illustrative embodiment of FIG. 2, IHS 200 may be a computing component, such as compute or storage sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of high-power processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may include multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a local area network (LAN), or a wide area network (WAN). In some embodiments, network controller 240 may be a replaceable expansion card or other component that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity.

As indicated in FIG. 2, IHS 200 may support storage drives 235*a-b* in various topologies, in the same manner as described with regard to the use of the various storage resources described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the hardware accelerator 250 and storage drives 235*a* may be components of a separate sled, such as a storage sled 115*a-n*. In some embodiments, the storage drives 235*a-b* of IHS 200 may include a combination of both SSD and magnetic disk storage drives. In other embodiments, all of the storage drives 235*a-b* of IHS 200 may be identical, or nearly identical.

PCIe switch 265*a* is coupled via a PCIe link to a hardware accelerator 250, such as a DPU, SmartNIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200.

Continuing with the example of FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some workloads, GPUs may be utilized as programmable computing resources for offloading other functions from CPUs 205, in the same manner as hardware accelerator 250.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245*a*, a variety of data storage devices, graphics processors and network interface cards may be coupled to IHS 200, thus supporting a wide variety of topologies of devices that may be coupled to the IHS 200 and that may be used in supporting redundant data storage systems.

Continuing with the example, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for validation the hardware and software used to provision IHS 200, may operate using validated instructions, and thus within the root of trust of IHS 200.

In some embodiments, remote access controller 230 may include a service processor 230*a*, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230*e* for exclusive use by the remote access controller in support of management operations.

In some embodiments, remote access controller 230 may implement monitoring and management operations using MCTP (Management Component Transport Protocol) messages that may be communicated to managed devices 205, 235*a-b*, 240, 250, 255, 260 via management connections supported by a sideband bus 255. In some instances, the sideband management connections supported by remote access controller 230 may include PLDM (Platform Level Data Model) management communications with the managed devices 205, 235*a-b*, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265*a-b*. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an 12C co-processor 230*b* of the remote access controller 230.

Remote access controller 230 may include a network adapter 230*c* that provides the remote access controller with network access that is separate from the network controller 240 utilized by other hardware components of the IHS 200. Through secure connections supported by network adapter 230*c*, remote access controller 230 communicates management information with remote management interface 101. In support of remote monitoring functions, network adapter 230*c* may support connections between remote access controller 255 and external management tools using wired and/or wireless network connections that operate using a variety of network technologies.

As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an 12C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the 12C sideband bus 255 connections used by the remote access controller 230 for device management.

In certain embodiments, the service processor 230a of remote access controller 230 may rely on an 12C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a 12C bus interface used to support communications with managed hardware components 205, 235a-b, 240, 250, 255, 260 of IHS. In some embodiments, the 12C co-processor 230b may be an integrated circuit on the same die as the service processor 230a, such as a peripheral system-on-chip feature that may be provided by the service processor 230a. The sideband 12C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In the present example, remote access controller 230 includes password module 230f. Password module 230f may be implemented as computer-executable instructions stored on a non-transitory computer readable medium, such as secured memory 230e. When executed by service processor 230a, password module 230f may perform password reset operations, such as described in more detail with respect to FIGS. 3-5.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a system-on-chip.

Figure 3:
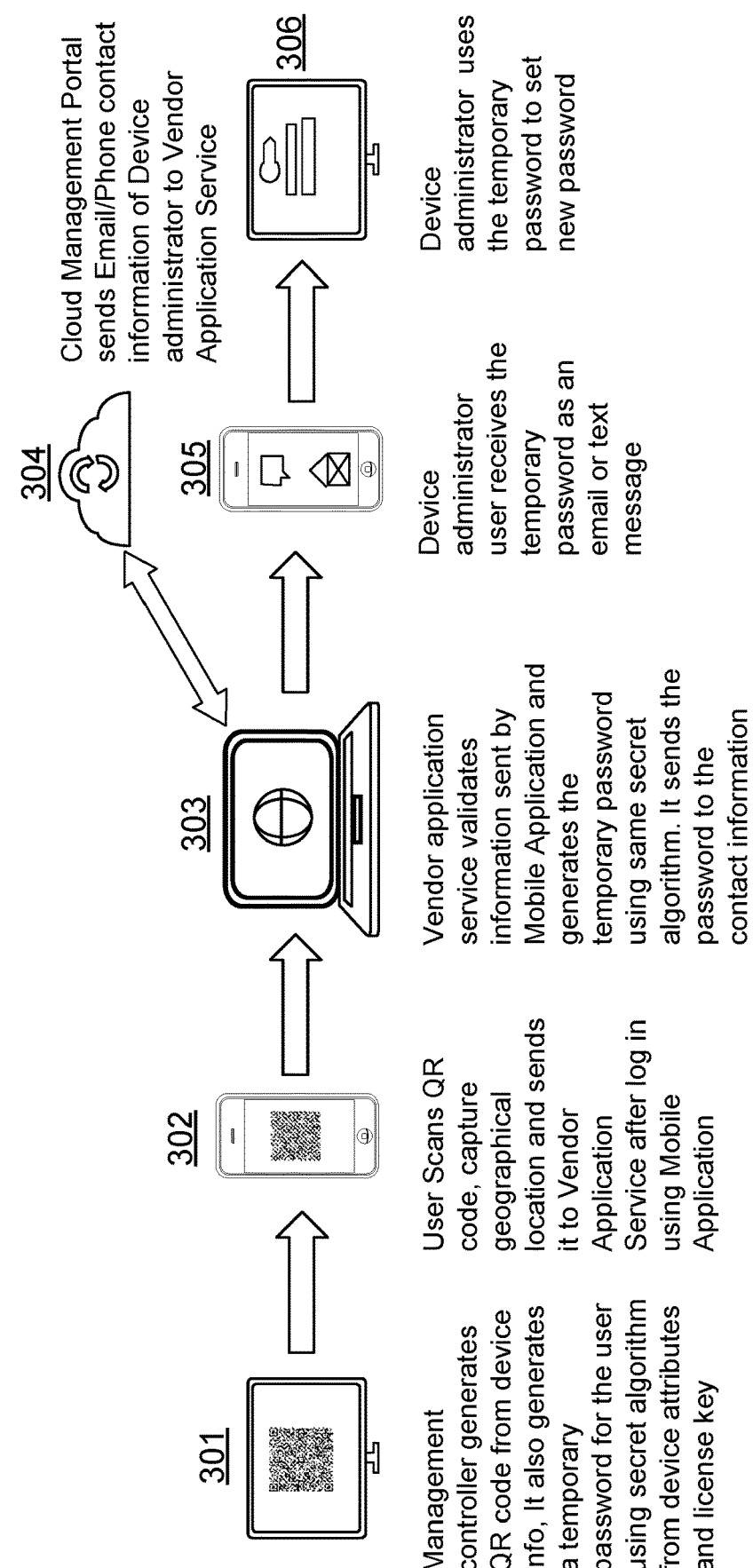
FIG. 3 is a diagram illustrating a method for resetting a password, according to some embodiments.

FIG. 3 is a diagram illustrating a flow of example method 300, according to one embodiment. Method 300 starts with a device administrator, such as a person who has management responsibilities for a device (e.g., sled, a chassis, or a rack) in a data center, desiring a password reset. The device administrator may select a "reset password" option on a user interface of a remote management tool, such as tool 101 of FIG. 1.

In this example, the user interface is in communication with a management controller of an IHS, such as any of remote access controllers 110, 120 of FIGS. 1 and 200 of FIG. 2. A password module, such as password module 230f of FIG. 2, may then begin the password reset process. Further in this example, the password itself is a password that provides access to the remote access controller and is typically treated with a higher level of security than are general applications. In other words, the device administrator in this example may have access to other passwords, such as passwords allowing the device administrator to access applications running on the IHS itself, but the administrator has at least temporarily lost access to the remote access controller.

Figure 4:
FIG. 4 is an illustration of an example set of attributes of an IHS and a signature of an IHS, according to some embodiments.

Continuing with the example, the password module 230f at the remote access controller generates a temporary password based upon a plurality of attributes of the IHS. Example attributes are shown at FIG. 4. For instance, ServiceTag is a unique identifier of the HIS, e.g. a serial number; iDRACFirmwareversion indicates a firmware version currently running on the remote access controller; Username is an existing username of the device administrator and is associated with the temporarily lost or forgotten password; Timestamp is a timestamp associated with the request to reset the password, and it may in some instances represent a time at which the password reset request was received by the remote access controller; Signature is a text string that is generated from a certificate associated with the IHS. For instance, the signature may be generated by encrypting one, some, or all of the attribute values with a private key of the IHS. The purpose of the signature is to allow an application in reception of the attribute information to validate the attribute information as being from the remote access controller.

Action 301 may further include the remote access controller generating computer-readable information representing the attributes. An example may include QR code 401 of FIG. 4, which encodes the attribute information. Action 301 may include the remote access controller displaying the QR code 401 on the user interface of a remote management tool. A QR code is a type of matrix barcode. Of course, the scope of implementations is not limited to a QR code, as any technique for encoding the information may be used.

At action 301, the remote access controller further generates a temporary password. For instance, the remote access controller, using password module 230f, may apply a hashing algorithm to some or all of the information in FIG. 4. In one example, the password module 230f receives as input the values for ServiceTag, iDRACFirmwareversion, Username, and Timestamp, applies a hashing algorithm to the input values, and generates a text string that will serve as a temporary password. In some examples, the hashing algorithm may be a secret algorithm that is stored with security (e.g., encrypted, stored to the silicon, or the like). Furthermore, the hashing algorithm may be deterministic so that it outputs the same temporary password given the same set of inputs. Any appropriate hashing algorithm may be used.

At action 302, the device administrator may have a mobile application running on a mobile device. For instance, the IHS may have a corresponding suite of management applications, one of which may be implemented as a mobile application. In some examples, the mobile application may be placed behind at least one layer of authentication, such as a single sign-on, assigned by an employer of the device administrator and enforced by the mobile device on which the mobile application runs. However, that single sign-on credential may be different from the password required to access the remote access controller.

The device administrator uses the mobile application to scan the quick response (QR) code, and the mobile application extracts the data (e.g., ServiceTag, . . . Signature)

from the QR code and sends that data to a vendor application along with other data that might be useful in validating the password reset request, such as a geographic location of the mobile device which scanned the QR code.

At action 303, the vendor application receives a message over a network from the mobile application. The request includes a password reset request as well as the data associated with the QR code (e.g., ServiceTag, . . . . Signature). The vendor application may be an application that is managed by an originator of the IHS, such as a company that builds and supports servers for data centers and for other uses. The vendor application may be for the vendor's use only and be isolated from customers and, more specifically, the device administrator and the mobile device. In one example, the vendor application may include data stored for the use of the vendor, such as identifications of devices, locations of deployments of the devices, customer identifiers, warranty information, operating system update information, and the like.

Further at action 303, the vendor application may verify the username and the IHS by comparing information in the message (e.g., ServiceTag, . . . . Signature) with records associated with the username and the IHS. Consistency between the received information and the vendor's records may indicate that the request is valid and may correspond to verification by the vendor application. Further, the vendor application may decrypt the signature using a public key associated with the IHS to verify that the request comes from the IHS and not from a malicious user.

The vendor application may also generate a temporary password. In this example, the vendor application includes a hashing algorithm that is the same as the hashing algorithm at the remote access controller. Given the same inputs, the hashing algorithm at the vendor application generates the same temporary password as was generated by the remote access controller.

The vendor application may also contact a cloud management portal associated with the device administrator at action 304. For instance, the employer of the device administrator may have a customer account set up with the vendor, where the customer account includes use of a cloud management portal. The employer of the device administrator may have a variety of account information set up in the cloud management portal, such as a customer identifier, warranty information, device identifiers, contact information for trusted users, and the like. In some examples, the cloud management portal may be exposed to users of the customer, such as the device administrator. The vendor application may request contact information from the cloud management portal, such as by sending a request for contact information along with an identifier of the customer, the username, the service tag of the IHS, or the like. The cloud management portal may then respond by providing the appropriate contact information.

At action 305, the vendor application transmits the temporary password to the contact information. For instance, the temporary password may be sent by text message, email, instant message, or by another technique. Security at action 305 is ensured through being sent to trusted contact information. Therefore, it may be desirable in some instances for the customer to make sure that its contact information and other information is up-to-date at the cloud management portal.

A user receives the message with the temporary password at action 305. The user may or may not be the same person as the device administrator who made the password request, and the associated mobile device may be the same or different than the mobile device used at action 302.

At action 306, the device administrator may enter their username and the temporary password into the user interface of the remote management tool of the remote access controller. In some embodiments, the temporary password may be valid for only a short time window, e.g., five minutes or so. The temporary window may be based on the timestamp, where the timestamp indicates a start of the window. Should the device administrator fail to enter the temporary password within the time window, then the password may become invalid, and the current (lost or forgotten) password remains the set password for the remote access controller.

On the other hand, should the device administrator enter the temporary password within the time window, then the remote access controller may provide access to further functions. In one example, the temporary password is a text string, and the remote access controller receives that temporary password and verifies that the entered text string matches the temporary password generated by its own hashing algorithm. Only in the event that the entered text string matches the temporary password generated by the remote access controller itself, would there be a password match. If the password does not match, then the user may be denied access.

In providing access to further functions, the remote access controller may provide general access to the device administrator once logged in. On the other hand, the remote access controller may require the device administrator to select a new password, different from the temporary password, and valid indefinitely or until a password change is required. The remote access controller may provide a prompt for the new password on the user interface of the remote management tool. Once the new password is set, then the device administrator may be granted general access to the remote access controller.

In this example, a characteristic of the remote access controller is that it is not exposed to the Internet. Therefore, the example of FIG. 3 relies on network access of the mobile application to transmit the information (e.g., ServiceTag, . . . . Signature) to the vendor application. For instance, the functions of the remote access controller may have the potential to ensure smooth running or catastrophe for the IHS and the business processes provided by the applications running on the IHS. Therefore, the employer of the device administrator may desire to keep the remote access controller isolated from the Internet and may even require that any access to the remote access controller be performed on-site at a workstation provided by the employer at the site.

The embodiment of FIG. 3 works within these constraints and provides convenient and secure password reset. For instance, some amount of security is provided by the secret nature of the hashing algorithm at both the vendor application and the remote access controller. The vendor application itself is not exposed to customers and may have strict access control, thereby reducing the chance of access by a malicious user. Action 302, which uses a mobile application associated with administration of the IHS, may further add security by being placed behind at least one level of authentication, as described above. Furthermore, the temporary password is only valid for a short period of time and is transmitted only to trusted contact information. As a result, the method 300 of FIG. 3 may be both secure and convenient. Method 300 may also be relatively inexpensive, as it may avoid or at least reduce the burden on vendor personnel to handle password reset requests.

Figure 5:
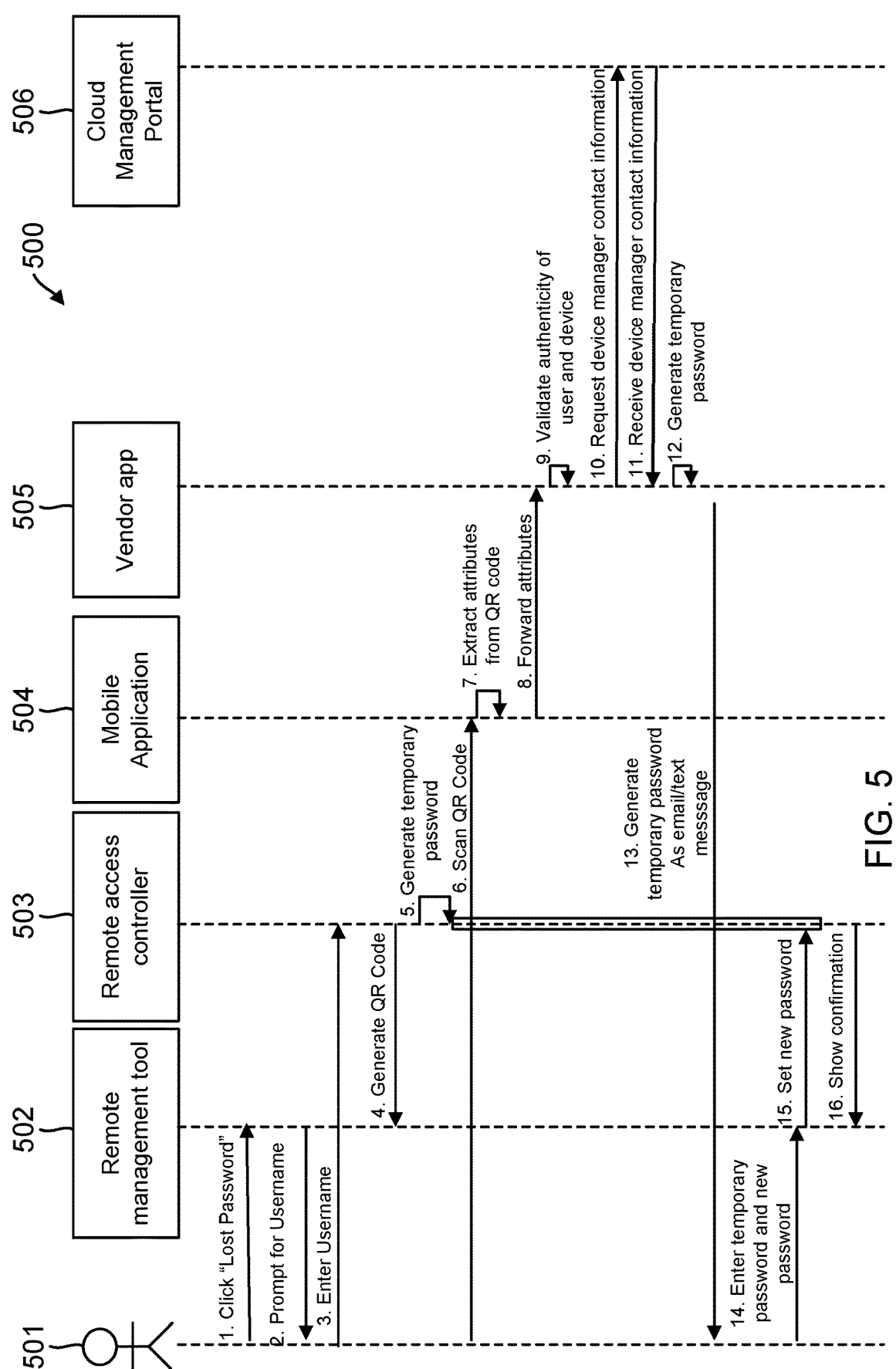
FIG. 5 is a swim lane diagram illustrating certain responsibilities of components of a system, according to some embodiments, for resetting a password of a remote access controller of an IHS.

FIG. 5 is a swim lane diagram illustrating certain responsibilities of components of a system, according to some embodiments, for resetting a password for a component of an IHS. At action 1, the user 501, such as a device administrator, selects an option on the user interface of the remote management tool 502. The option may be for a password reset, such as by clicking "Lost Password" or some other appropriate option on the user interface. The remote management tool 502 may be the same as or similar to the remote management tools 101 of FIG. 1. In response, the user interface may prompt the user 501 at action 2 for a username, which the user 501 may provide at action 3.

Upon receipt of the username and the user's request, the remote access controller 503 may access attributes of the IHS. In one example, the remote access controller 503 may be the same as or similar to remote access controllers 110, 120, 200, and the actions of the remote access controller 503 to reset the password may be performed by password module 230*f*. The remote access controller 503 may access and/or generate information (e.g., ServiceTag, . . . . Signature) and then generate computer-readable information, such as a QR code at action 4, from that information. An example was described above with respect to action 302 of FIG. 3.

At action 5, the remote access controller 503 may generate a temporary password from some or all of the information (e.g., ServiceTag, . . . . Signature) through use of a hashing algorithm.

Action 4 may include the remote access controller 503 displaying the QR code on a user interface of the remote management tool 502. At action 6, the user 501 may use the mobile application 504 to scan the QR code, and the mobile application may extract the attributes, which is the information ServiceTag, . . . . Timestamp and the signature, and forward some or all of that information to the vendor application 505 at action 8.

At action 9, the vendor application 505 validates the authenticity of the user and the device. For instance, the device may include an IHS that includes the remote access controller 503. The vendor application 505 may validate the authenticity of the IHS by any appropriate technique, including decrypting the signature with a public key of the IHS. The vendor application 505 may validate the user by any appropriate technique, including checking the username against a record of valid usernames associated with the customer, checking a location from which the request originated against a known customer location, or the like. An example of the vendor application 505 includes the vendor application at action 303 of FIG. 3.

At action 10, the vendor application 505 requests device manager contact information from the cloud management portal 506. An example of the cloud management portal includes the cloud management portal at action 304 of FIG. 3. At action 11, the vendor application 505 receives the device manager contact information from the cloud management portal at 506. For instance, the device manager contact information may include an email, a phone number, an instant message identifier, and/or the like, which is associated with the customer name at a database managed by the cloud management portal 506.

At action 12, the vendor application generates a temporary password using a secure hashing algorithm. An example was described above at action 303 of FIG. 3. Further in this example, the temporary password at action 12 may match the temporary password at action 5 because the remote access controller 503 and the vendor application 505 use the same or similar hashing algorithms to produce the same temporary password from the same set of inputs.

Action 13 may include the vendor application sending the temporary password to the mobile application 504 as a text message, email, or the like. The user 501 may visually see a text string representing the temporary password by viewing the message from action 13. The user 501 may then type in the temporary password at the user interface of the remote management tool 502 at action 14. Once the temporary password has been validated by the remote access controller 503, the remote access controller may further prompt the user 501 to select a new password to replace the temporary password. The user 501 may then work with the user interface of the remote management tool 502 and the remote access controller 503 to set a new password at action 15. The remote access controller may then show a confirmation upon the user interface of the remote management tool 502 at action 16.

The scope of embodiments is not limited to the actions of FIGS. 3 and 5. For instance, the method 300 and 500 may be repeated for different users at different times or for the same user 501 at different times. Furthermore, if the user 501 fails to enter the temporary password within a specified time window, then the temporary password may expire, thereby causing the user 501 to repeat the process to generate and retrieve the temporary password. Also, should the user 501 enter the text string incorrectly, then the user 501 may be prohibited from accessing the resources of the remote access controller 503 unless and until the user 501 enters the text string correctly.

Additionally, the methods 300 and 500 may be expected to deny access to a malicious user. Specifically, the malicious user would not be expected to have access to the mobile application 504 because the mobile application 504 would be expected to use some kind of authentication such as a single sign-on credential. Additionally, a malicious user would not be expected to have access to the message at action 13 because the message would have been sent to an authorized user in the database of the cloud management portal 506. Also, the remote management tool 502 may be expected to be used at a same facility as the remote access controller 503 and the IHS are physically located, thereby limiting use to a particular protected physical location.

Various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A chassis comprising:
a plurality of Information Handling Systems (IHSs), each comprising one or more hardware CPUs (Central Processing Units);
a management controller implemented in a first IHS of the plurality of IHSs, wherein the management controller includes a hardware processor and a memory, wherein the hardware processor of the management controller is configured to read and execute computer-readable instructions from the memory to cause the hardware processor of the management controller to support remote monitoring and administration of the first IHS, further wherein the hardware processor of the management controller is configured to:
  receive a request to reset a first password, wherein the first password provides access to the management controller;
  generate and display machine-readable information based upon a plurality of attributes of the first IHS;
  generate a temporary password based upon the plurality of attributes of the first IHS and a timestamp associated with the request, including inputting the timestamp and the plurality of attributes into a hashing algorithm and receiving the temporary password as output of the hashing algorithm;
  receive input comprising a text string in a user interface (UI);
  verify that the text string matches the temporary password; and
  provide access to further functions of the management controller in response to the text string matching the temporary password.

2. The chassis of claim 1, wherein the machine-readable information includes a signature generated from a certificate associated with the IHS.

3. The chassis of claim 1, wherein the machine-readable information comprises a matrix barcode from which the plurality of attributes may be extracted.

4. The chassis of claim 1, wherein the further functions of the management controller comprise a prompt to set a second password to replace the first password.

5. The chassis of claim 1, wherein the hardware processor of the management controller is further configured to verify that an entry time of the temporary password falls within a time window, wherein the time window is based on the timestamp included within the plurality of attributes.

6. The chassis of claim 1, wherein the plurality of attributes comprises an identifier of the IHS, a username associated with a user, and the timestamp.

7. The chassis of claim 1, wherein the machine-readable information includes a signature generated from a certificate associated with the IHS, and wherein the management controller is configured to generate the temporary password further based upon the signature.

8. The chassis of claim 1, wherein the management controller comprises a baseboard management controller (BMC).

9. The chassis of claim 1, wherein the IHS comprises a server in a data center, wherein the management controller is isolated from the Internet, and wherein the management controller supports out-of-band administration of the server.

10. A computer-readable storage device having instructions stored thereon for resetting a first password of a management controller of an Information Handling System (IHS), wherein execution of the instructions by one or more processors of the management controller causes the one or more processors to:
  generate and display machine-readable information based upon a first attribute of the IHS and a timestamp associated with a request to reset the first password;
  generate a temporary password based upon the first attribute of the IHS and the timestamp, including inputting the timestamp and the first attribute into a hashing algorithm and receiving the temporary password as output of the hashing algorithm;
  receive input comprising a text string in a user interface (UI);
  verify that the text string matches the temporary password; and
  provide access to further functions of the management controller in response to the text string matching the temporary password.

11. The computer-readable storage device of claim 10, further comprising instructions which cause the one or more processors to:
  display the machine-readable information as a matrix barcode via the UI.

12. The computer-readable storage device of claim 10, wherein the first attribute comprises at least one item selected from a list consisting of: an identifier of the IHS, a username associated with a user, and a firmware version.

13. The computer-readable storage device of claim 10, further comprising instructions which cause the one or more processors to:
  verify that receipt of the temporary password is within a time window, wherein the time window is based upon the timestamp.

14. The computer-readable storage device of claim 10, further comprising instructions which cause the one or more processors to:
  generate the temporary password by the management controller, which comprises a baseboard management controller (BMC).

15. A method comprising:
  generating and displaying machine-readable information based upon a first attribute of an Information Handling System (IHS) and a timestamp associated with a request to reset a first password of a management controller of the IHS;
  generating a temporary password based upon the first attribute of the IHS and the timestamp, including inputting the timestamp and the first attribute into a hashing algorithm and receiving the temporary password as output of the hashing algorithm;
  receiving input comprising a text string in a user interface (UI);

verifying that the text string matches the temporary pass-
   word; and providing access to further functions of the management
   controller in response to the text string matching the
   temporary password.

16. The method of claim 15, further comprising:

displaying the machine-readable information as a matrix
   barcode via the UI.

17. The method of claim 15, wherein the first attribute
comprises at least one item selected from a list consisting of:
an identifier of the IHS, a username associated with a user,
and a firmware version.

18. The method of claim 15, further comprising:

verifying that receipt of the temporary password is within
   a time window, wherein the time window is based upon
   the timestamp.

19. The method of claim 15, wherein generating the
temporary password is performed by the management con-
troller, which comprises a baseboard management controller
(BMC).

* * * * *